Figure 3:
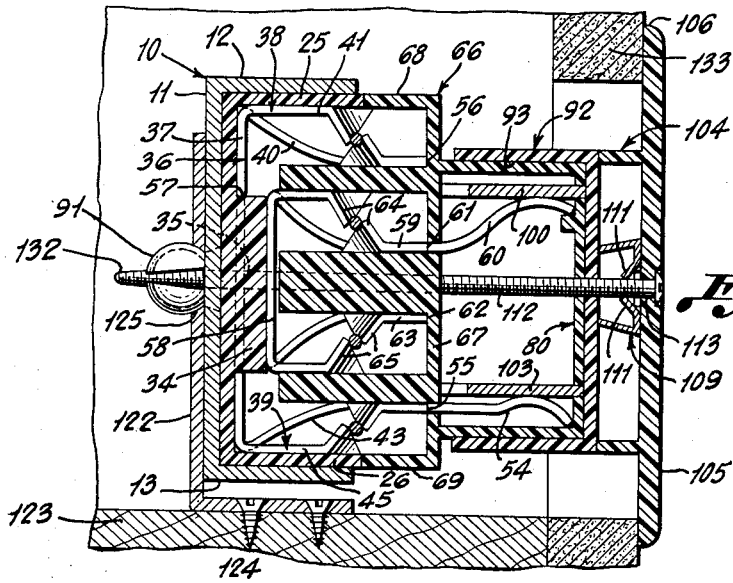

Nov. 17, 1964    H. I. RICHARDS    3,157,732
MULTI-PART ELECTRICAL JUNCTION BOX AND PLUG-IN ACCESSORY
Filed April 3, 1963    4 Sheets-Sheet 1
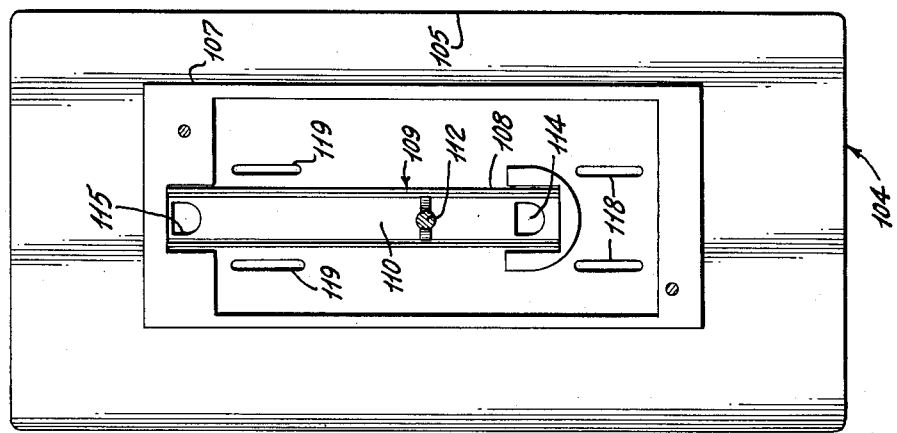
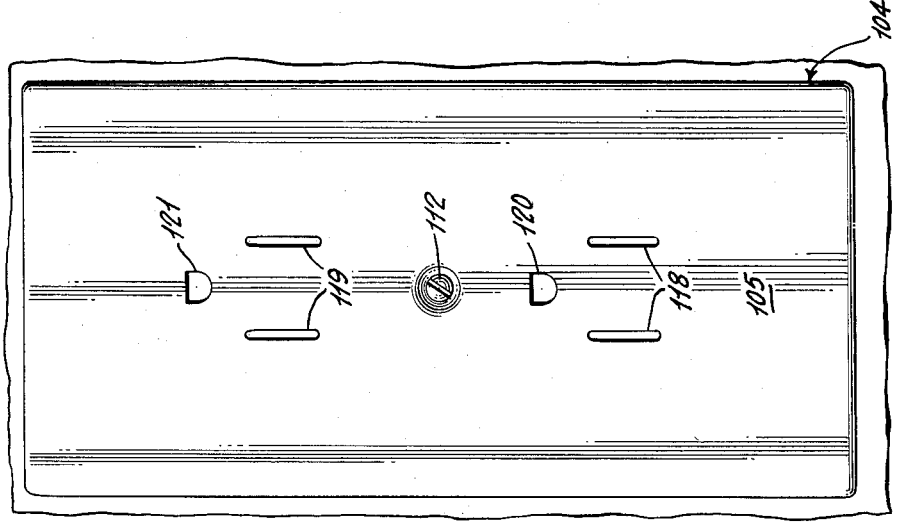
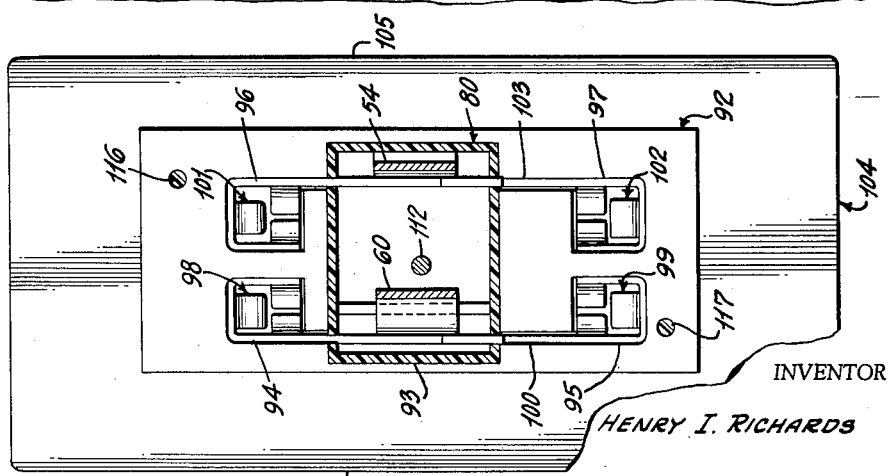
INVENTOR
HENRY I. RICHARDS
BY Donald H. Eaton
AGENT

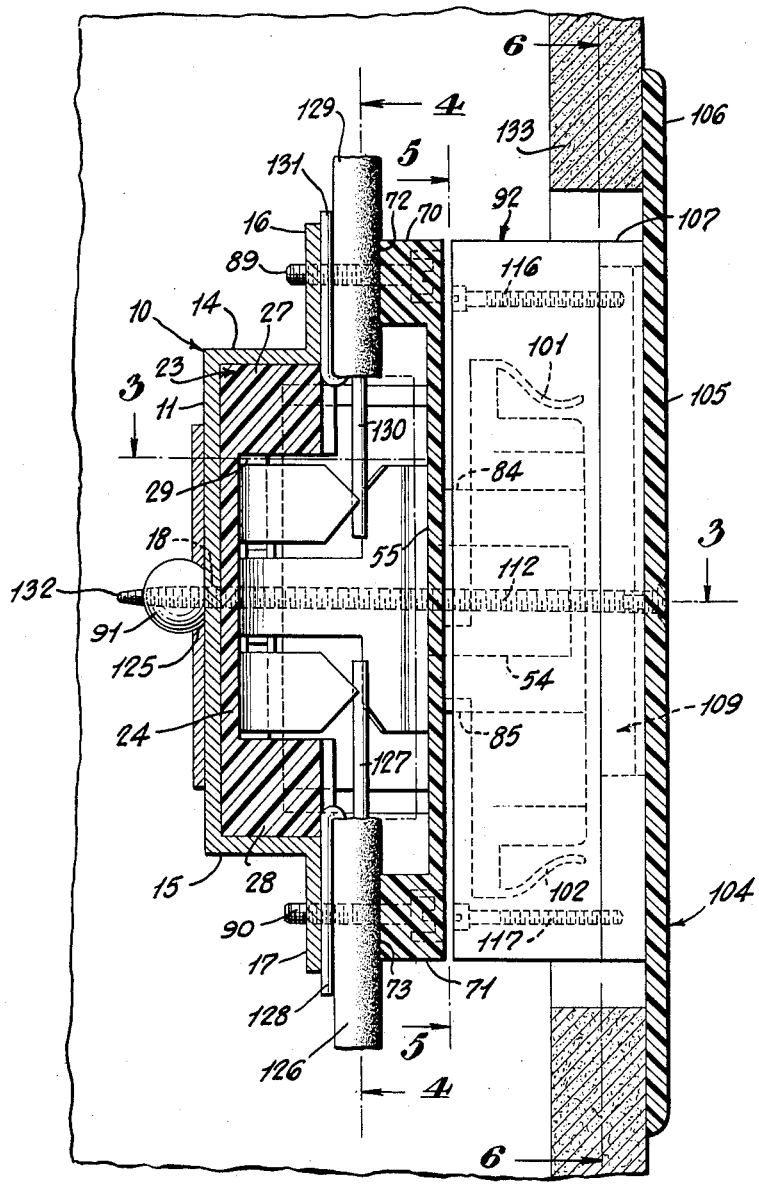

INVENTOR
HENRY I. RICHARDS
BY Donald G. Eaton
AGENT

Nov. 17, 1964  H. I. RICHARDS  3,157,732
MULTI-PART ELECTRICAL JUNCTION BOX AND PLUG-IN ACCESSORY
Filed April 3, 1963  4 Sheets-Sheet 4

INVENTOR
HENRY I. RICHARDS

BY Donald Y. Eaton
AGENT

United States Patent Office 3,157,732
Patented Nov. 17, 1964

3,157,732
MULTI-PART ELECTRICAL JUNCTION BOX AND PLUG-IN ACCESSORY
Henry I. Richards, Arlington, Va., assignor to R-B Corporation, Arlington, Va., a corporation of Virginia
Filed Apr. 3, 1963, Ser. No. 270,357
14 Claims. (Cl. 174—53)

This invention relates to electrical wiring equipment, and more particularly to a junction box and plug-in accessory in which the junction box may be conveniently installed in a building with wires connected thereto, and in which numerous different types of plug-in accessories may be conveniently plugged in to the junction box and secured in place thereon, and where the junction box is installed in an opening of a wall of a building the plug-in accessory also serves to close such opening.

Heretofore, numerous types of electrical junction boxes have been proposed and utilized, the majority of these providing merely binding posts or other threaded means for attaching wires within the boxes, and furthermore these prior art boxes did not in general provide any means for conveniently connecting an accessory such as a switch, a light fixture, a clock, a thermostat or other accessory thereto. In general, where it was desired to utilize an accessory such as a switch or an outlet, this was provided as an integral part of the junction box, and once the same was installed in a building with wires connected thereto, such accessory was the only one which could be utilized in this location, without removing the entire junction box and replacing the same with a junction box incorporating a different type of accessory. Furthermore, in the cases where automatic wire connecting means was provided, such means was not always entirely satisfactory in that in many cases a relatively poor electrical contact resulted, and furthermore relatively minor misalignment of parts or wires resulted in considerable difficulty in inserting and attaching the wires to the junction boxes. Also, in many cases it was difficult to secure the junction boxes in place in the wall of the building. It is further to be noted that these prior art junction boxes usually could accommodate only a very limited range of wire sizes, and furthermore considerable skill and dexterity was necessary, both for installation of the junction boxes and for connecting wires thereto.

It is accordingly an object of the invention to provide an electrical junction box and plug-in accessory which may be supplied in a pre-assembled condition for convenient installation in a building, with the wires being connected to the junction box merely by inserting the same in openings provided therefor, and tightening the cover in place on the junction box, which serves to provide a secure, low-resistance, electrical connection.

A further object of the invention is the provision of an electrical junction box and plug-in accessory, in which such accessory may comprise an electrical outlet, a switch, a light fixture, or the like, and in which such accessory is installed merely by plugging the same into the junction box and securing the same in place by a single, screw-threaded member.

A still further object of the invention is the provision of an electrical junction box having means for receiving up to four cables, each cable having two conductors and a ground wire, the junction box including means for automatically providing an electrical connection between the conductors and contact elements in the junction box.

Another object of the invention is the provision of an electrical junction box and plug-in accessory in which the accessory provides an electrical outlet, means for receiving two electrical plugs together with a ground connection for each plug are provided.

A further object of the invention is the provision of an electrical junction box, including snap-fastener means for attaching such junction box to a bracket secured to a part of a building, and in which such snap-fastener may be expanded to provide a permanent fastening for the junction box when installing a plug-in accessory on the junction box.

A still further object of the invention is the provision of an electrical junction box and plug-in accessory which may be conveniently and economically manufactured from readily available materials by relatively simple die casting or molding, and sheet metal stamping operations, thereby maintaining the cost of the device at a minimum.

Another object of the invention is the provision of an electrical junction box having means providing for automatic electrical contact with the conductors of cables when inserted therein, and also including means compensating for misalignment of the conductors in such cables.

Figure 4:
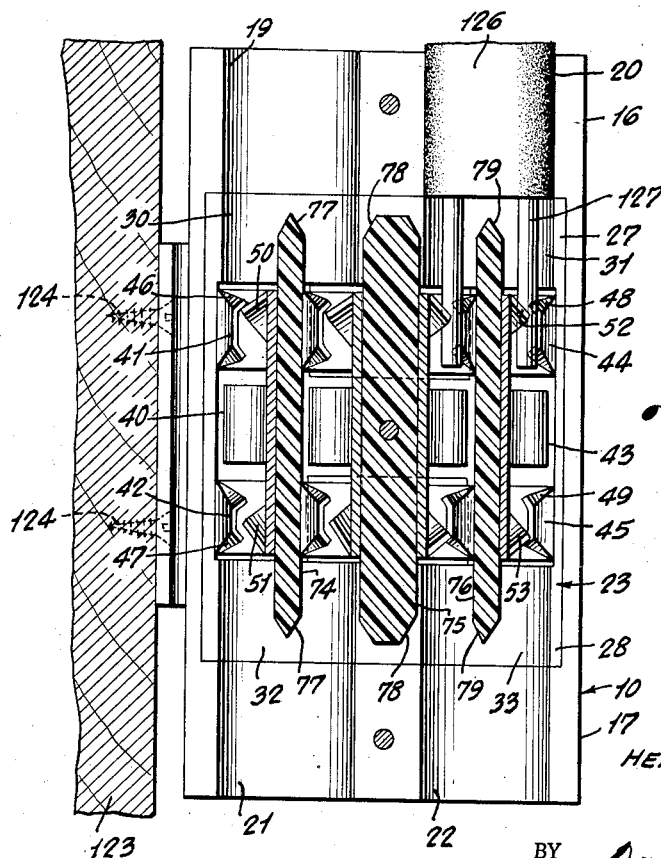
Figure 7:
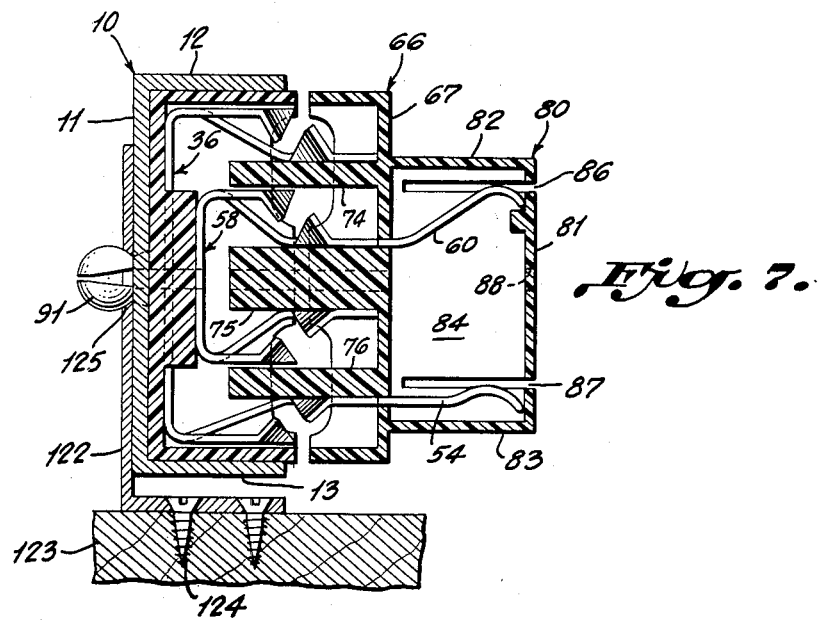
Figure 8:
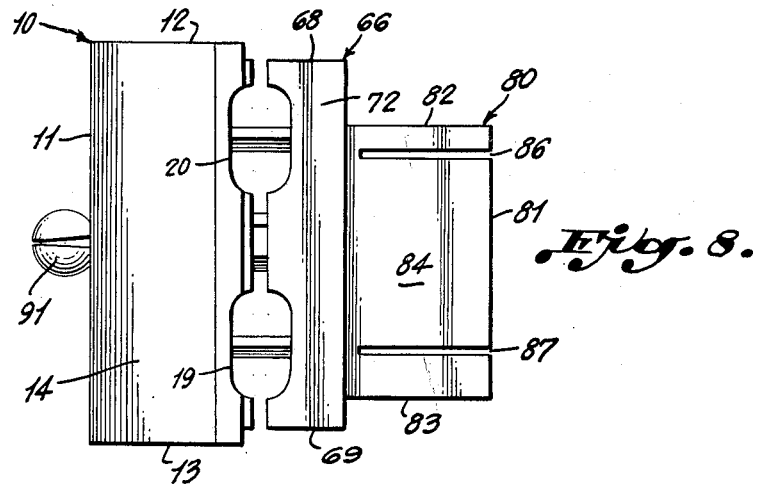

Further objects and advantages of the invention will be apparent from the following description taken in conjunction with the accompanying drawings, wherein:

FIG. 1 is a front elevational view showing the electrical junction box and plug-in accessory of this invention installed in the wall of a building;

FIG. 2 a sectional view showing the electrical junction box and plug-in accessory in place in the wall of a building, and also showing electrical cables inserted in and connected to the junction box;

FIG. 3 a sectional view taken substantially on the line 3—3 of FIG. 2, and showing the manner in which the contact elements in the junction box engage the conductors of cables inserted therein, and also showing the manner in which the contacts of the accessory engage contact prongs on the junction box;

FIG. 4 a sectional view taken substantially on the line 4—4 of FIG. 2, and showing the means for compensating for misalignment of the conductors in the electrical cables;

FIG. 5 a sectional view taken substantially on the line 5—5 of FIG. 2, and showing a portion of a plug-in accessory;

FIG. 6, a sectional view taken substantially on the line 6—6 of FIG. 2, and showing the other portion of a plug-in accessory;

FIG. 7, a transverse sectional view showing the junction box in position in a building but prior to insertion and connection of the electrical cables thereto; and FIG. 8, an end elevational view of the junction box and plug-in accessory, but without the electrical cables connected thereto.

With continued reference to the drawings, and particularly FIGS. 2, 3, and 4, there is shown an electrical junction box constructed in accordance with this invention, such box comprising a generally rectangular metallic open top base 10 having a bottom wall 11, side walls 12 and 13, end walls 14 and 15, an outwardly projecting flange 16 adjacent the upper edge of end wall 14, and an outwardly projecting flange 17 adjacent the upper edge of end wall 15. The bottom wall 11 is provided with a central aperture 18. The flange 16 is provided with concave, upwardly opening cable-receiving seats 19 and 20, while the flange 17 is provided with upwardly opening cable-receiving seats 21 and 22.

A generally rectangular body 23 of insulating material is disposed in the base 10, and the body 23 is provided with a bottom wall portion 24 engaging the bottom wall 11 of the base 10, side wall portions 25 and 26, and relatively thick end wall portions 27 and 28, providing an upwardly opening recess 29. The end wall portion 27 is provided with upwardly opening concave cable-receiving seats 30 and 31 in alignment with the seats 19 and 20, respectively, and the end wall portion 28 is provided with concave upwardly opening cable-receiving seats 32 and 33, in alignment with the seats 21 and 22, respectively. A centrally disposed generally rectangular upstanding boss 34 is provided on the bottom wall portion 24, and the boss 34 is provided with a central aperture 35 in alignment with the aperture 18 in the bottom wall 11 of the base 10.

A generally U-shaped sheet metal contact member 36 is disposed in the recess 29, and the contact member 36 comprises a web 37 and spaced legs 38 and 39. The leg 38 is formed to provide an intermediate portion 40, and separate side portions 41 and 42, and in a similar manner the leg 39 is formed to provide an intermediate portion 43, and separate size portions 44 and 45. As clearly shown in FIG. 3, the intermediate portion 40 is disposed inwardly of the side portions 41 and 42, and the intermediate portion 43 is disposed inwardly of the side portions 44 and 45. The side portions 41 and 42 are provided with inwardly projecting contact lugs 46 and 47, while the side portions 44 and 45 are provided with inwardly projecting contact lugs 48 and 49. The intermediate portion 40 is provided with a pair of outwardly projecting contact lugs 50 and 51, while the intermediate portion 43 is provided with a pair of outwardly projecting contact lugs 52 and 53, and it is to be noted that the lugs 50 and 51 are in alignment with the lugs 46 and 47, while the lugs 52 and 53 are in alignment with the lugs 48 and 49. As is clearly shown in FIGS. 2, 3 and 4, the contact lugs are provided with opposed, bevelled conductor contacting surfaces. It will be noted from an inspection of FIG. 3 that the intermediate portion 43 extends above the intermediate portion 40 to provide a contact prong 54, and the intermediate portion 43 is provided with a shoulder 55 disposed at substantially the same level as the upper end 56 of the intermediate portion 40. The web 37 of the contact member 36 is provided with a generally rectangular central aperture 57 for receiving the boss 34 of the body 23.

A second generally U-shaped sheet metal contact member 58 is of substantially the same type and configuration as the contact member 36, except that the central rectangular aperture is omitted, and the web of the contact member 58 engages the upper surface of the boss 34. The contact member 58 is provided with intermediate and side portions in the same manner as the contact member 36, and the intermediate portion 59 of the contact member 58 extends upwardly and terminates in a contact prong 60, and this intermediate member 59 is also provided with a shoulder 61 disposed at substantially the same level as the upper end 62 of the intermediate member 63 of the contact member 58. The contact member 58 is provided with conductor engaging lugs 64 as well as lugs 65 which are of the same type and configuration as the conductor-engaging contact lugs on the contact member 36.

A cover 66 of insulating material is formed by a top wall 67, side walls 68 and 69, and relatively thick end walls 70 and 71. The end walls 70 and 71 are provided with spaced pairs of downwardly opening concave cable-receiving seats 72 and 73 which, when the cover 66 is in position on the body 23, are in alignment with the seats 19, 20, 21 and 22. Spaced depending partitions 74, 75 and 76 are provided on the top wall 67 of the cover 66, and as clearly shown in FIGS. 3 and 4, the partitions 74 and 76 are disposed between the contact portions of the contact member 36, while the partition 75 is disposed between the contact portions of the contact memebr 58. The opposite ends of the partition 74 are bevelled as shown at 77, and the opposite ends of the partition 75 are bevelled as shown at 78. In a similar manner the opposite ends of the partition 76 are also bevelled as shown at 79.

An upstanding generally rectangular, hollow housing 80 is provided on the top wall 67 of the cover 66, and the housing 80 comprises a top wall 81, side walls 82 and 83, and end walls 84 and 85. The contact prongs 54 and 60 are received within the housing 80, as clearly shown in FIG. 7. The top wall 81 and end walls 84 and 85 of the housing 80 are provided with spaced slots 86 and 87, the slot 86 being adjacent the contact prong 60 and the slot 87 being adjacent the contact prong 54. The top wall 81 of the housing 80 is provided with a central aperture 88, and screw-threaded means 89 and 90 is provided for securing the cover 66 to the base 10. A hollow, generally spherical expansible fastening member 91 depends from the central portion of the base 10 in alignment with the aperture 35 in the body 23, and the purpose and operation of the fastening member 91 will be later described.

With particular reference to FIGS. 2, 3, 5 and 6, there is shown a plug-in accessory for use with the junction box above described, and while this plug-in accessory is in the nature of an electrical outlet, it is to be understood that other types of plug-in accessories may be utilized with the junction box of this invention, and such other types of plug-in accessories will include the same basic features as those to be described in connection with the electrical outlet.

A plug-in accessory such as an electrical outlet may comprise a generally rectangular body 92 of insulating material, and such body is provided with a central downwardly opening rectangular recess 93, the purpose of which will be later described. The body 92 is provided with spaced pairs of upwardly opening sockets, the sockets 94 and 95 constituting one pair, and the sockets 96 and 97 constituting the other pair. It will be seen from an inspection of FIG. 5 that the sockets 94 and 96 are disposed on the opposite side of the downwardly opening recess 93 from the sockets 95 and 97. Resilient contact elements 98 and 99 are disposed in the sockets 94 and 95, and such contact elements are connected by a strap 100. In a similar manner, resilient contact elements 101 and 102 are disposed in the sockets 96 and 97, and are connected by a strap 103. It is to be noted that the straps 100 and 103 extend through the downwardly opening 93 in the body 92.

A cover 104 is provided for the accessory body 92, and such cover may include a cover plate 105, providing a marginal flange 106, and depending from the cover plate 105 is a generally rectangular portion 107. As best shown in FIG. 6, the depending rectangular portion 107 is provided with an elongated, downwardly opening recess 108, and disposed in such downwardly opening recess is an elongated ground contact element 109. As best shown in FIGS. 3 and 6, the ground contact element 109 is generally U-shaped in cross-section, and the web 110 is provided with an aperture having marginal ears 111 for engaging and retaining an elongated screw-threaded member 112 which projects downwardly through an aperture 113 in the cover plate 105. The web 110 of the ground contact element 109 is also provided with apertures 114 and 115, the purpose of which will presently appear.

The cover 104 will be secured to the accessory body 92 by screw-threaded or other suitable fastening means 116 and 117, and this operates to retain the resilient contact elements as well as the ground contact element 109 in place in the recesses in the accessory body 92, and the cover 104.

As best shown in FIGS. 1 and 6, the cover plate 105 of the cover 104 may be provided with a pair of slots 118 in alignment with the resilient contact elements 99 and 102, and a second pair of slots 119 in alignment with the resilient contact elements 98 and 101. An aperture 120 is also provided in alignment with the aperture 114 in the ground contact element 109, and a second aperture 121 is provided in alignment with the aperture 115 in the ground contact element 109. The slots 118 operate to receive the conductor prongs of a conventional electrical plug, while the aperture 120 operates to receive the ground conductor prong of such plug, and it will be seen that the prongs of the plug will engage the appropriate resilient contact elements in the accessory body, as well as the ground contact element 109.

In utilizing the electrical junction box and plug-in accessory of this invention, it is contemplated that the junction box will be secured to a portion of the building in which the same is installed, and for this purpose there may be provided a suitable bracket 122, as shown in FIGS. 3 and 7, and such bracket may be secured to a stud 123 or other building part by screw-threaded or other suitable fastening means 124. The bracket 122 is provided with an aperture 125, and in order to temporarily secure the junction box in place, the fastening member 91 is snapped into and through the aperture 125 in the bracket 122. By reason of the resilient, expansible nature of the fastening member 91, this operates to snugly retain the junction box in position on the bracket 122, while connecting conducting cables thereto.

The junction box is installed on the bracket 122 with the cover portion 66 spaced above the body 23, as shown in FIG. 7, and in this condition an electrical cable 126 with the insulation removed to expose the conductors 127, and with the ground wire 128 bent rearwardly beneath the insulation of the cable 126, as clearly shown in FIG. 2, may be inserted through the opening provided by the cable-receiving seats 31 and 73 in the flange 17 of the base 10, and the end wall 71 of the box cover 66, and as clearly shown in FIGS. 2 and 4, the conductors 127 pass between the bevelled contact portions 48 and 52 of the contact elements in the junction box. In a similar manner, as shown in FIG. 2, a second cable 129 may be positioned in the opposite end of the junction box, with the conductors 130 engaging the appropriate bevelled contact surfaces of the contact elements in the junction box, and with the ground wire 131 engaging the flange 16 of the base 10. At this time the screw-threaded elements 89 and 90 may be tightened to move the cover 66 downwardly, thereby engaging the top wall 67 of the cover 66 with the shoulders 55 and 61 on the contact elements 43 and 59, and also engaging the upper ends 56 and 62 of the contact elements 40 and 63, and as clearly shown in FIG. 3, further downward movement of the cover 66 will result in tightly engaging the contact elements with the conductors 127 and 130. At the same time, downward movement of the cover 66 will operate to firmly clamp the cables 126 and 129 in position, with the ground wires 128 and 131 engaging the flanges 17 and 16 of the base 10 to provide a ground connection therewith.

Thereafter, the plug-in accessory may be installed simply by inserting the same in place, with the upstanding rectangular housing 80 on the cover 66 of the junction box received in the downwardly opening recess 93 of the plug-in accessory, and with the straps 100 and 103 passing downwardly through the slots 86 and 87 of the housing 80 to engage the contact prongs 60 and 54, thereby establishing an electrical circuit between the conductors of the cables 126 and 129, and the resilient contact elements in the plug-in accessory. At the same time the elongated, screw-threaded member 112 carried by the plug-in accessory moves downwardly through the aligned central apertures, and into the hollow, expansible fastening member 91, and since the lower end 132 of the screw-threaded member 112 is tapered, threaded engagement of the same with the fastening member 91 will operate to expand the same, and firmly clamp the junction box in place on the bracket 122, and of course, the screw-threaded member 112 threadedly engaging the fastening member 91 operates to retain the plug-in accessory firmly in position on the junction box, and with the marginal flange 106 of the cover plate 105 engaging the plaster or other wall surface 133 of the building or other structure in which the device is installed. It will also be seen that engagement of the screw-threaded member 112 with the fastening member 91, which in turn is secured to the metallic base 10, results in providing a ground circuit between the base 10 and the elongated ground contact member 109 in the plug-in accessory.

The above-described structure is particularly advantageous in that as clearly shown in FIGS. 7 and 8, the cover 66 is yieldably maintained spaced from the body 23 and the flanges 16 and 17 of the base 10 by engagement of the top wall 67 of the cover 66 with the shoulders 55 and 61 of the sheet metal contact members 36 and 58. Consequently, the junction box is maintained against inadvertent closing in a convenient condition for installation of the same, and insertion of electric cables between the cover 66 and the flanges 16 and 17 of the base 10, it only being necessary to thereafter move the cover 66 toward the base 10 by actuation of the screw threaded members 89 and 90, which will operate to clamp the cables in place with the conductors engaging and gripped by the contact members.

Furthermore, the contact members 36 and 58 are sufficiently yieldable to accommodate conductors of different sizes and to compensate for commercial tolerances in the dimensions of the various parts.

It will be seen that by the above-described invention there has been provided an electrical junction box in which one or more electrical cables can be conveniently attached thereto merely by inserting such cables through openings provided therefor, and by tightening the cover of the junction box which operates to provide a firm, low resistance, electrical connection between the conductors of the cables, and the contact elements of the junction box, and furthermore, misalignment of the conductors of the cables is compensated for by the bevelled ends of the partition members in the junction box. Likewise, convenient means is provided for temporarily securing the junction box in place in a building during attachments of electrical cables thereto, and upon completion of the attachment of such electrical cables, a suitable plug-in accessory may be conveniently installed merely by moving such accessory into position with the contacts thereof engaging the contacts of the junction box, and the operation of securing the accessory in position also operates to secure the junction box in position on a bracket provided therefor.

While one type of plug-in accessory comprising an electrical outlet has been described, it is, of course, understood that other types of plug-in accessories such as switches, electrical fixtures, thermostats, or the like, may be utilized merely by providing the necessary structure to accommodate the same to the junction box of this invention, and it is to be noted that the only tools required for making the necessary electrical connections and installing both the junction box and plug-in accessory is a screwdriver, and the means necessary to remove the insulation from the ends of the electrical cables to be installed in the junction box. It is also to be noted that the position of the plug-in accessory with respect to the junction box is not critical, thereby serving to compensate for variations in plaster or wall thickness.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. An electrical junction box for installation in a building, said box comprising a generally rectangular metallic open top base having bottom, side and end walls and an outwardly projecting flange adjacent the upper edge of each wall, said bottom wall having a central aperture, spaced concave cable-receiving seats in the upper surface of each flange, a generally rectangular body of insulating material disposed in said base, said body having a bottom wall portion engaging said bottom wall, side wall portions and relatively thick end wall portions providing an upwardly opening recess, the upper edges of said end wall portions having spaced concave cable-receiving seats in alignment with the seats in said flanges, a centrally disposed generally rectangular upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, opposed bevelled conductor contacting surfaces on said lugs, one intermediate portion being longer than the other and terminating in a contact prong, a shoulder on said one intermediate portion disposed at substantially the same level as the end of said other intermediate portion and said web having a central generally rectangular aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said intermediate portion, each second intermediate portion being disposed inwardly of said second side portion, a second inwardly projecting contact lug on each second side portion, a second pair of outwardly projecting contact lugs on each second intermediate portion in alignment with the lugs on said second side portions, opposed bevelled conductor contacting surfaces on said second lugs, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss with said other second intermediate and side portions adjacent and spaced from said one first intermediate and side portions and with said one second intermediate and side portions adjacent and spaced from said other first intermediate and side portions, said contact lugs being in alignment with said seats, a cover of insulating material having a top wall, side walls and relatively thick end walls, spaced concave cable-receiving seats in the lower surfaces of said cover end walls, depending spaced partitions on said top wall, the opposite ends of said partitions being bevelled, an upstanding, generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots and with the seats in said cover end walls in opposed alignment with the seats in said flanges, whereby with said cover loosely received on said base cables may be inserted between said opposed seats with the conductors of said cables disposed between said contact lugs and upon securing said cover tightly in place said cables will be clamped in place and said top wall of said cap engaging said shoulders and the ends of said first and second other intermediate portions will move said contact lugs into intimate engagement with said conductors.

2. An electrical junction box for installation in a building, said box comprising a generally rectangular metallic open top base having bottom, side and end walls and an outwardly projecting flange adjacent the upper edge of each end wall, said bottom wall having a central aperture, spaced concave cable-receiving seats in the upper surface of each flange, a generally rectangular body of insulating material disposed in said base, said body having a bottom wall portion engaging said bottom wall, side wall portions and relatively thick end wall portions providing an upwardly opening recess, the upper edges of said end wall portions having spaced concave cable-receiving seats in alignment with the seats in said flanges, a centrally disposed upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, opposed bevelled conductor contacting surfaces on said lugs, one intermediate portion being longer than the other and terminating in a contact prong, a shoulder on said one intermediate portion disposed at substantially the same level as the end of said other intermediate portion and said web having a central aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, opposed bevelled conductor contacting surfaces on said second lugs, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss with said other second intermediate and side portions adjacent and spaced from said one first intermediate and side portions and with said one second intermediate and side portions adjacent and spaced from said other first intermediate and side portions, said contact lugs being in alignment with said seats, a cover of insulating material having a top wall, side walls and relatively thick end walls, spaced concave cable-receiving seats in the lower surfaces of said cover end walls, depending spaced partitions on said top wall, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots and with the seats in said cover end walls in opposed alignment with the seats in said flanges, whereby with said cover loosely received on said base cables may be inserted between said opposed seats with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

3. An electrical junction box for installation in a building, said box comprising a generally rectangular metallic open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions and relatively thick end wall portions providing an upwardly opening recess, a centrally disposed upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, opposed bevelled conductor contacting surfaces on said lugs, one intermediate portion being longer than the other and terminating in a contact prong, a shoulder on said one intermediate portion disposed at substantially the same level as the end of said other intermediate portion and said web having a central aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, opposed bevelled conductor contacting surfaces on said second lugs, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss with said other second intermediate and side portions adjacent and spaced from said one first intermediate and side portions and with said one second intermediate and side portions adjacent and spaced from said other first intermediate and side portions, a cover of insulating material having a top wall, side walls and relatively thick end walls, depending spaced partitions on said top wall, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said base, whereby with said cover loosely received on said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

4. An electrical junction box for installation in a building, said box comprising a generally rectangular open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions and end wall portions providing an upwardly opening recess, a centrally disposed upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, opposed bevelled conductor contacting surfaces on said lugs, one intermediate portion being longer than the other and terminating in a contact prong, a shoulder on said one intermediate portion disposed at substantially the same level as the end of said other intermediate portion and said web having a central aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, opposed bevelled conductor contacting surfaces on said second lugs, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss and with said other second intermediate and side portions adjacent and spaced from said one first intermediate and side portions and with said one second intermediate and side portions adjacent and spaced from said other first intermediate and side portions, a cover of insulating material having a top wall, side walls and end walls, depending spaced partitions on said top wall, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots, whereby with said cover loosely received on said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

5. An electrical junction box for installation in a building, said box comprising a generally rectangular open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions and end wall portions providing an upwardly opening recess, a centrally disposed upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, one intermediate portion being longer than the other and terminating in a contact prong, a shoulder on said one intermediate portion disposed at substantially the same level as the end of said other intermediate portion and said web having a central aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss and with said other second intermediate and side portions adjacent and spaced from said one first intermediate and side portions and with said one second and intermediate and side portions ajacent and spaced from said other first intermediate and side portions, a cover of insulating material having a top wall, side walls and end walls, depending spaced partitions on said top wall, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots, whereby with said cover loosely received on said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

6. An electrical junction box for installation in a building, said box comprising a generally rectangular open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions providing an upwardly opening recess, a centrally disposed upstanding boss on said bottom wall portion, said boss having a central aperture therein, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, one intermediate portion being longer than the other and terminating in a contact prong, a shoulder on said one intermediate portion disposed at substantially the same level as the end of said other intermediate portion and said web having a central aperture, said contact member being disposed in said recess with said aperture receiving said boss, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess in engagement with the upper surface of said boss and with said other second intermediate and side portions adjacent and spaced from said one first intermediate and side portions and with said one second intermediate and side portions adjacent and spaced from said other first intermediate and side portions, a cover of insulating material having a top wall, side walls and end walls, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots, whereby with said cover loosely received on said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

7. An electrical junction box for installation in a building, said box comprising a generally rectangular open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions and end wall portions providing an upwardly opening recess, a generally U-shaped sheet metal contact member comprising a web and spaced legs, each leg being formed to provide an intermediate portion and a separate side portion on each side of said intermediate portion, each intermediate portion being disposed inwardly of said side portions, an inwardly projecting contact lug on each side portion, a pair of outwardly projecting contact lugs on each intermediate portion in alignment with the lugs on said side portions, one intermediate portion being longer than the other and terminating in a contact prong, a shoulder on said one intermediate portion disposed at substantially the same level as the end of said other intermediate portion, said contact member being disposed in said recess, a second generally U-shaped sheet metal contact member comprising a web and spaced legs, each of said last-named legs being formed to provide a second intermediate portion and a second separate side portion on each side of said second intermediate portion, each second intermediate portion being disposed inwardly of said second side portions, a second inwardly projecting contact lug on each second side portion, a second pair of outwardly projecting contact lugs on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess with said other second intermediate and side portions adjacent and spaced from said one first intermediate and side portions and with said one second intermediate and side portions adjacent and spaced from said other first intermediate and side portions, a cover of insulating material having a top wall, side walls and end walls, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots, whereby with said cover loosely received in said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

8. An electrical junction box for installation in a building, said box comprising a generally rectangular open top base having bottom, side and end walls and an outwardly projecting flange adjacent the upper edge of each end wall, said bottom wall having a central aperture, a generally rectangular body of insulating material disposed in said base, said body having a bottom wall portion engaging said bottom wall, side wall portions and end wall portions providing an upwardly opening recess, a generally U-shaped sheet metal contact member comprising a web and spaced legs, each leg being formed to provide an intermediate portion and a separate side portion on one side of said intermediate portion, each intermediate portion being disposed inwardly of each side portion, an inwardly projecting contact lug on each side portion, an outwardly projecting contact lug on each intermediate portion in alignment with the lugs on said side portions, one intermediate portion being longer than the other and terminating in a contact prong, a shoulder on said one intermediate portion disposed at substantially the same level as the end of said other intermediate portion, said contact member being disposed in said recess, a second generally U-shaped sheet metal contact member comprising a web and spaced legs, each of said last-named legs being formed to provide a second intermediate portion and a second separate side portion on one side of each second intermediate portion, each second intermediate portion being disposed inwardly of said side portions, a second inwardly projecting contact lug on each second side portion, a second outwardly projecting contact lug on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess with said other second intermediate and side portions adjacent and spaced from said one first intermediate and side portions and with said one second intermediate and side portions adjacent and spaced from said other first intermediate and side portions, a cover of insulating material having a top wall, side walls and end walls, an upstanding generally rectangular hollow housing integral with said top wall, said housing having top, side and end walls, said top and end walls of said housing having spaced slots therein, said top wall of said housing having a central aperture therein and means to secure said cover to said base with said prongs received in said housing adjacent said slots, whereby with said cover loosely received on said base cables may be inserted between said cover end walls and said flanges with the conductors of said cables disposed between said contact lugs and upon securing said cover tightly in place said cables will be clamped in place and top wall of said cover engaging said shoulders and the ends of said first and second other intermediate portions will move said contact lugs into intimate engagement with said conductors.

9. An electrical junction box for installation in a building, said box comprising a generally rectangular open top base having bottom, side and end walls and an outwardly projecting flange adjacent the upper edge of each end wall, a generally rectangular body of insulating material disposed in said base, said body having a bottom wall portion engaging said bottom wall, side wall portions and end wall portions providing an upwardly opening recess, a generally U-shaped sheet metal contact member comprising a web and spaced legs, each leg being formed to provide an intermediate portion and a separate side portion on one side of said intermediate portion, each intermediate portion being disposed inwardly of each side portion, an inwardly projecting contact lug on each side portion, an outwardly projecting contact lug on each intermediate portion in alignment with the lug on said side portions, one intermediate portion being longer than the other and terminating in a contact prong, a shoulder on one said intermediate portion disposed at substantially the same level as the end of said other intermediate portion, said contact member being disposed in said recess, a second generally U-shaped sheet metal contact member comprising a web and spaced legs, each of said last-named legs being formed to provide a second intermediate portion and a second separate side portion on one side of each second intermediate portion, each second intermediate portion being disposed inwardly of said second side portions, a second inwardly projecting contact lug on each second side portion, a second outwardly projecting contact lug on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess with said other second intermediate and side portions adjacent and spaced from said one first intermediate and side portions and with said one second intermediate and side portions adjacent and spaced from said other first intermediate and side portions, a cover of insulating material having a top wall, side walls and end walls, an upstanding generally rectangular hollow housing integral with said top wall, said housing having top, side and end walls, said top and end walls of said housing having spaced slots therein and means to secure said cover to said base with said prongs received in said housing adjacent said slots, whereby with said cover loosely received on said base cables may be inserted between said cover end walls and said flanges with the conductors of said cables disposed between said contact lugs and upon securing said cover tightly in place said cables will be clamped in place and said top wall of said cover engaging said shoulders and the ends of said first and second other intermediate portions will move said contact lugs into intimate engagement with said conductors.

10. An electrical junction box as defined in claim 1 and including in combination a plug-in accessory, said accessory comprising a generally rectangular body of insulating material, a central downwardly opening rectangular recess in said accessory body, spaced pairs of upwardly opening sockets in said accessory body, one socket of each pair being disposed on the opposite side of said downwardly opening recess from the other sockets, a resilient contact element disposed in each socket, a strap connecting the contact elements in each pair of sockets, said straps extending through said downwardly opening recess, a cover for said accessory body comprising a plate providing a marginal flange and a central rectangular depending portion, an elongated downwardly opening recess in said depending portion, a ground contact element disposed in said elongated recess, means to secure said cover to said accessory body to retain said contact elements in place, said plate having apertures in alignment with said contact elements in said sockets and with said ground contact elements, an expansible fastening member depending from said base in alignment with the apertures in said base and boss for engaging an aperture in a bracket and means in said fastening member for threadedly engaging a tapered screw, whereby said accessory may be applied to said junction box with said housing received in said downwardly opening recess with said straps received in said slots and engaging said contact prongs and a screw extending through apertures in said plates, ground contact element, boss, body and base and threadedly engaging said fastening member to secure said accessory in place and expand said fastening member to secure the assembly to a bracket, said screw providing a ground connection between said ground contact member, said base and ground wires in said cables engaging the flanges on said base.

11. An electrical junction box as defined in claim 1, and including in combination a plug-in accessory, said accessory comprising a generally rectangular body of insulating material, a central downwardly opening rectangular recess in said accessory body, spaced pairs of upwardly opening sockets in said accessory body, one socket of each pair being disposed on the opposite side of said downwardly opening recess from the other sockets, a resilient contact element disposed in each socket, a strap connecting the contact elements in each pair of sockets, said straps extending through said downwardly opening recess, a cover plate for said accessory body, means to secure said cover to said accessory body to retain said contact elements in place, said cover plate having apertures in alignment with said contact elements in said sockets, an expansible fastening member depending from said base in alignment with the apertures in said base and boss for engaging an aperture in a bracket and means in said fastening member for threadedly engaging a tapered screw, whereby said accessory may be applied to said junction box with said housing received in said downwardly opening recess with said straps received in said slots and engaging said contact prongs and a screw extending through apertures in said plate, boss, body and base and threadedly engaging said fastening member to secure said accesosry in place and expand said fastening member to secure the assembly to a bracket.

12. An electrical junction box as defined in claim 1, and including in combination a plug-in accessory, said accessory comprising a generally rectangular body of insulating material, a central downwardly opening rectangular recess in said accessory body, upwardly opening sockets in said accessory body, contact elements disposed in said sockets, a strap on each contact element extending through said downwardly opening recess, a cover plate for said accessory body, means to secure said cover to said accessory body to retain said contact elements in place, an expansible fastening member depending from said base in alignment with the apertures in said base and boss for engaging an aperture in a bracket and means in said fastening member for threadedly engaging a tapered screw, whereby said accessory may be applied to said junction box with said housing received in said downwardly opening recess with said straps received in said slots and engaging said contact prongs and a screw extending through apertures in said plate, boss, body and base and threadedly engaging said fastening member to secure said accessory in place and expand said fastening member to secure the assembly to a bracket.

13. An electrical junction box for installation in a building, said box comprising a generally rectangular open top base having bottom, side and end walls and an outwardly projecting flange adjacent the upper edge of each end wall, a generally rectangular body of insulating material disposed in said base, said body having a bottom wall portion engaging said bottom wall, side wall portions and end wall portions providing an upwardly opening recess, a generally U-shaped sheet metal contact member comprising a web and spaced legs, each leg being formed to provide an intermediate portion and a separate side portion, each intermediate portion being disposed inwardly of each side portion, an inwardly projecting contact lug on each side portion, an outwardly projecting contact lug on each intermediate portion in alignment with the lug on said side portions, one intermediate portion being longer than the other and terminating in a contact prong, a shoulder on said one intermediate portion disposed at substantially the same level as the end of said other intermediate portion, said contact member being disposed in said recess, a second generally U-shaped sheet metal contact member comprising a web and spaced legs, each of said last-named legs being formed to provide a second intermediate portion and a second separate side portion on one side of each second intermediate portion, each second intermediate portion being disposed inwardly of said second side portions, a second inwardly projecting contact lug on each second side portion, a second outwardly projecting contact lug on each second intermediate portion in alignment with the lugs on said second side portions, one second intermediate portion being longer than the other and terminating in a second contact prong and a shoulder on said one second intermediate portion disposed at substantially the same level as the end of said other second intermediate portion, said second contact member being disposed in said recess with said other second intermediate and side portions adjacent and spaced from said one first intermediate and side portions and with said one second intermediate and side portions adjacent and spaced from said other first intermediate and side portions, a cover of insulating material having a top wall, side walls and end walls, an upstanding generally rectangular hollow housing integral with said top wall, said housing having top, side and end walls, said top and end walls of said housing having spaced slots therein, means to secure said cover to said base with said prongs received in said housing adjacent said slots and a resilient fastening member depending from said base for engaging an aperture in a bracket to secure said junction box thereto, said shoulders engaging the top wall of said cover serving to yieldably maintain said cover spaced from the flanges on said base.

14. An electrical junction box as defined in claim 1, and including in combination a plug-in accessory, said accessory comprising a generally rectangular body of insulating material, a central downwardly opening rectangular recess in said accessory body, sockets in said accessory body, contact elements disposed in said sockets, a strap on each contact element extending through said downwardly opening recess, an expansible fastening member depending from said base in alignment with the apertures in said base and boss for engaging an aperture in a bracket and means in said fastening member for threadedly engaging a tapered screw, whereby said accessory may be applied to said junction box with said housing received in said downwardly opening recess with said straps received in said slots and engaging said contact prongs and a screw extending through apertures in said accessory body, boss, body and base and threadedly engaging said fastening member to secure said accessory in place and expand said fastening member to secure the assembly to a bracket.

No references cited.